US011263876B2

(12) United States Patent
Cifarelli et al.

(10) Patent No.: US 11,263,876 B2
(45) Date of Patent: Mar. 1, 2022

(54) SELF-SERVICE TERMINAL (SST) MAINTENANCE AND SUPPORT PROCESSING

(71) Applicant: NCR Corporation, Duluth, GA (US)

(72) Inventors: Claudio Cifarelli, Rome (IT); Gardiner Arthur, Broughty Ferry (GB); Iain M. N. Cowan, Glasgow (GB); Massimo Mastropietro, Rome (IT); Callum Ellis Morton, Cupar (GB)

(73) Assignee: NCR Corporation, Atlanta, GA (US)

( * ) Notice: Subject to any disclaimer, the term of this patent is extended or adjusted under 35 U.S.C. 154(b) by 301 days.

(21) Appl. No.: 15/718,450

(22) Filed: Sep. 28, 2017

(65) Prior Publication Data
US 2019/0096196 A1 Mar. 28, 2019

(51) Int. Cl.
*G07F 19/00* (2006.01)
*G06Q 20/10* (2012.01)
*G06N 7/00* (2006.01)

(52) U.S. Cl.
CPC ........... *G07F 19/209* (2013.01); *G06N 7/005* (2013.01)

(58) Field of Classification Search
CPC ........ G05B 2219/37434; G05B 23/024; G06Q 10/20; G06Q 20/10; G06Q 20/18; G06Q 20/20; G06Q 10/04; G06Q 10/06
USPC .......................................................... 705/43
See application file for complete search history.

(56) References Cited

U.S. PATENT DOCUMENTS

| | | | | | |
|---|---|---|---|---|---|
| 10,089,907 | B2 * | 10/2018 | Thul | ..................... | G09F 9/3026 |
| 10,395,444 | B1 * | 8/2019 | Edren | ..................... | G07C 5/008 |
| 10,410,480 | B2 * | 9/2019 | Dietz | ................... | G07F 19/2055 |
| 10,551,812 | B2 * | 2/2020 | Cella | ......................... | G06N 3/08 |
| 10,613,962 | B1 * | 4/2020 | Delange | ............... | G06F 11/3006 |
| 2004/0167774 | A1 * | 8/2004 | Shrivastav | .............. | G10L 17/26 704/207 |
| 2005/0081410 | A1 * | 4/2005 | Furem | ................ | G05B 23/0235 37/379 |
| 2013/0159787 | A1 * | 6/2013 | Yingling, Jr | .......... | G06F 11/008 714/47.3 |
| 2015/0339586 | A1 * | 11/2015 | Adjaoute | .................. | G06N 3/08 706/52 |
| 2016/0245279 | A1 * | 8/2016 | Pal | ......................... | G01M 3/025 |

FOREIGN PATENT DOCUMENTS

| | | | | |
|---|---|---|---|---|
| CA | 2721830 | A1 * | 10/2009 | ............. G01C 21/16 |
| CN | 101263499 | B | * 7/2006 | ............... G07C 3/00 |

OTHER PUBLICATIONS

Alsina et al., On the use of machine learning methods to predict component reliability from data-driven industrial case studies, Sep. 11, 2017 (Year: 2017).*

* cited by examiner

*Primary Examiner* — Hao Fu (74) *Attorney, Agent, or Firm* — Schwegman, Lundberg & Woessner (57) ABSTRACT

Data is collected for Self-Service Terminals (SSTs) including tallies, events, and outcomes associated with servicing the SSTs. Statistical correlations are derived from the tallies and events with respect to the outcomes. Subsequent collected data is processed with the statistical correlations and a probability for a failure of a component or a part of the component associated with a particular SST is reported for servicing the component or part before the failure.

18 Claims, 4 Drawing Sheets

SELF-SERVICE TERMINAL (SST) MAINTENANCE AND SUPPORT PROCESSING

BACKGROUND

Maintenance and support of Self-Service Terminals (SSTs) is a challenging exercise. For example, an Automated Teller Machine (ATM—and a type of SST) includes a variety of integrated devices and media that periodically needs replenishment. Each integrated device may malfunction from time to time and require a service engineer to perform service or replace any of the integrated devices. Media, such as currency notes and receipt paper, also require replenishment during normal operation of the ATM. It is therefore not uncommon to have to physically attend to ATMs with regularity.

A large managed network of ATMs typically requires a large support staff. When an ATM is offline and awaiting service, the ATM is unavailable for customer use, which results in a loss of revenue for a financial institution associated with that ATM. Efficient maintenance and support of ATMs are of primary importance to organizational expenses and revenues.

SUMMARY

In various embodiments, methods and a system for SST maintenance and support processing are presented.

According to an embodiment, a method for SST maintenance and support processing is presented. More particularly, tallies, events, and outcomes are obtained that are associated with service tickets for SSTs. Statistical correlations between the tallies and events with respect to the outcomes are found. The statistical correlations are applied to a new set of tallies and a new set of events for the SSTs, and a probable issue with respect to at least part of a particular SST is reported based on the applying.

DETAILED DESCRIPTION

Figure 1:
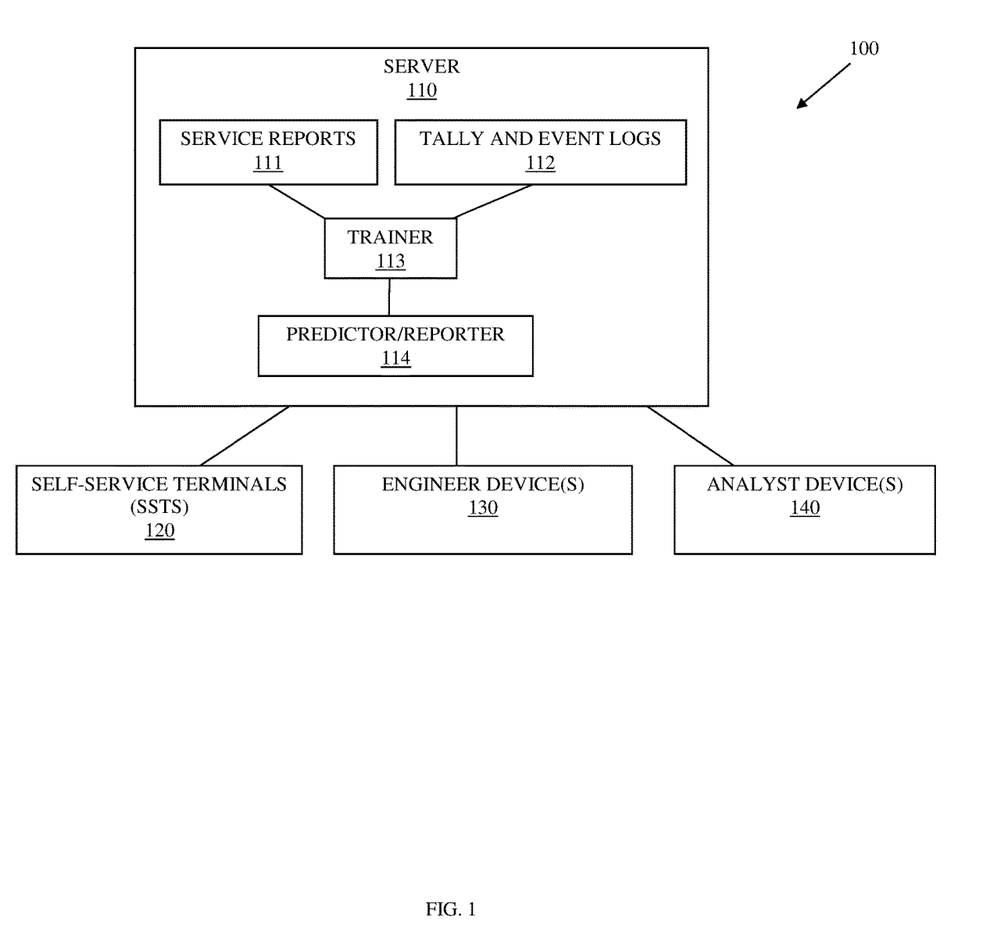
FIG. 1 is a diagram of a system for SST maintenance and support processing, according to an example embodiment.

FIG. 1 is a diagram of a system 100 for SST maintenance and support processing, according to an example embodiment. The various components are illustrated and the arrangement of the components is presented for purposes of illustration only. It is to be noted that other arrangements with more or less components are possible without departing from the SST maintenance and support teachings presented herein and below.

The techniques, methods, and system presented herein and below for SST maintenance and support processing can be implemented in whole or in part in one, all, or some combination of the components shown with the system 100. The techniques and methods are programmed as executable instructions in memory and/or non-transitory computer-readable storage media and processed on one or more processors associated with the various components.

The system 100 includes a server 110, a plurality of SSTs 120, one or more engineer-operated devices 130, and one or more analyst devices 140. The server 110 includes service-related data gathered for the SSTs 120, such as service reports/records 111 and tally and event logs 112. The service-related data may be collected and organized in one or more databases. The service reports/records 111 include actions taken by service engineers to resolve service calls/tickets for maintenance and support issues with the SSTs 120.

The tally and event logs 112 include a variety of information that is automatically pulled from the SSTs 120 at predefined intervals of time and/or dynamically in real time and/or are automatically reported by the SSTs 120 to the server 110 at predefined intervals of time and/or dynamically in real time when events are detected by the SSTs 120.

By way of example only, the tally logs can include data, such as: SST identifier to uniquely identify a specific SST, date and time a specific that tallies were collected and totals for the SST that include: double notes picked, extra notes picked, false pick interrupts, holed notes picked, invalid LVDT results, invalid notes picked, long notes picked, miss picks, note jams or sensor faults, notes picked, overlong notes picked, pick failures, short notes picked, triple notes picked, notes in bin, false interrupts at pre-LVDT sensor, jams or pre-LVDT sensor faults, jams or sensor #1 faults, jams or sensor #2 faults, jams or sensor #3 faults, jams or sensor #4 faults, jams or sensor #5 faults, jams or sensor #5 faults, jams or sensor #6 faults, jams or sensor #7 faults, jams or sensor #8 faults, note stacks presented, purge operations. The tally logs can also include totals relevant to a receipt printer for print lines, jams, receipt paper replaced, etc.

The event logs can include, by way of example only, custom events defined by an enterprise for a specific type of SST. For example, some example events reported can include (for an ATM), HF Disp Disabled—cannot dispense cash or stamps, CPM—Horizontal Streaks on Check-Open, consecutive reboot—check reader disabled, check reader disabled fault—envelope free ATM, check acceptor disabled fault—envelope free ATM, check acceptor escrow fault—envelope free ATM, SDM—check container removed, SDM—interlock open, SDM—internal communication failure, SDM—SDM core jam, SDM—infeed jam, SDM—feeder jam, SDM—ERBM jam, SDM—ERBM hardware fault, SDM—capture bin jam, SDM—cash bin full, no print on deposit envelope, cash accepter fault—envelope free, check acceptor fault—envelope free, SDM—E.F. ATM no print on checks after ink was replaced per EAPD no PR INT on deposit—envelope free, threshold depository error, vault door signal broken, SDM—item too short, SDM—infeed jam, SDM—IBVM jam, SDM—IBVM hardware fault, SDM—interlock open, SDM—capture bin removed, SDM—shutter jam closed, SDM—feeder jam, SDM—core jam, SDM—escrow and rebunch jam, SDM—USB disconnected, SDM—media too long, SDM—capture bin jam, SDM—escrow and rebunch hardware fault, SDM—core transport guide open.

It is noted that the above-presented data types for the tallies and the events of the tally and event logs 112 can be customized based on the type of SST 120, the type of transactions that an SST 120 performs, and the type of media that is dispensed by the SST 120.

Furthermore, each tally or event data value collected in the tally and event logs 112 can be linked through the SST identifier to a specific SST 120 for any given period of time.

The service reports 111 also include specific SST identifiers and a service ticket identifier for identifying specific SSTs 120 and service tickets in records within the service reports 111. The service engineers operating devices 130 provide specific resolutions to service tickets made to a specific SST 120. This allows for capturing data about the component pieces of the SSTs 120 that may not typically be reported as an event from the SST 120 or may not typically be included in tallies collected for the SST 120. The service engineer may have sensors that are attached to components of the SST 120 for gathering signal data relevant to element bearings, element vibration, power estimate density, broken rotor bars, broken end-ring in rotor cage, shorted coil, shorted turn in stator winding. This data captured on site by the service engineer while servicing a SST 120 is provided in the service reports for obtaining fine-grain metrics of the components and parts of the components (such as, motors, tracks, sensors, pumps, compressors, valves, turbines, microphones, cameras, HVAC machines, and others). The service reports also indicate when parts of a component of the SST 120 or a component itself are replaced or serviced in some manner.

In an embodiment, the signal data captured by sensors attached to the SST 120 during a service call is processed for extracting signal features, such as spectral slope, audio spectrum flatness, MFCC, etc. The same can be done for vibrations associated with rotational and mechanical components of the SST 120.

In fact, any data collected by the service engineer through attaching sensors, microphones, etc. are accessible through the service reports 111. Again, this provides fine-grain data gathered during each service call to an SST 120.

A wealth of data for each service call is provided in the tally and event logs 112 and the service reports 111. Service calls also result in some outcome with respect to a service ticket. The outcome is what the service engineer did to resolve the problem with the SST 120.

This historical data and the results (tallies, events, signal/vibration, and outcomes) are provided as input to a statistical-based machine learning trainer 113 that finds statistical patterns/correlations between the tallies, events, and signal/vibration data, with the specific outcomes in resolving a service ticket (service call made by the service engineer). In an embodiment, classification trees, SVM (Support Vector Machine) and logistic regression algorithms are processed by the trainer 113 for finding predictor variables from the tallies, events, and signal/vibration data and corresponding observed actions taken by the service engineers (outcomes) for deriving a function with respect to the predictor variables within a statistical tolerance level to arrive at a desired outcome.

The function can then be processed by the predictor 114 on new incoming tallies and events in real time to predict a service issue before a service call is made. The function can also be processed to specifically instruct the service engineer to take specific actions to resolve a newly issued service ticket. Furthermore, a survival model algorithm can be processed to provide the likelihood of a future but as of yet unseen fault with a SST 120 or one or more of its component machinery (components and/or parts of the components). A hybrid approach utilizing classification trees can be processed by the predictor 114 to identify when a SST 120 or one of its components/parts is likely to fail or require maintenance. This provides a proactive approach for performing preventive maintenance on a SST 120 before faults occur.

The predictor 114 provides an indication and a statistical assessment as to when an SST 120 is likely to fail and what the failing component/part is likely to be. The predictor 114 can also be processed to provide specific guidance to the service engineer when service tickets are already outstanding for the SST 120.

The trainer 113 is continually processing as new tallies, events, signal/vibration data are collected along with the outcomes from the service reports 111. This continually refines the predictor 114 through machine learning such that the predictor 114 becomes more and more accurate over time. So, the predicator 114 more accurately predicts (over time) what is going to happen (e.g., a failure in a depository of an SST 120) and when it is going to happen (e.g. in less than a week from the current date). The predictor 114 also becomes more accurate in specific instructions to service engineers to resolve an already-outstanding service ticket.

In an embodiment, the trainer 113 is trained at the part level (component or component piece) of detail from the historical and ongoing dynamically collected tallies, events, signal/vibration data, and outcomes. The training can be done in classifications of parts for a specific component. Hierarchical classification trees can participate in the training as well, such that parts are grouped based on a function of a specific component, and the grouped parts are further grouped for the specific component, and the specific component grouped with other related components. This allows the predictor to provide fine-grain and coarse grain guidance and problem (issue) predictions at the part level, component level, SST level, and/or a hierarchical levels representing some combination of these things.

In an embodiment, the service reports 111 and the tally and events 112 are collected from a plurality of databases that house tally, event, and service ticket outcome data from an enterprise. In an embodiment, the collected data is augmented with signal/vibration readings.

In an embodiment, the service reports 111 and the tally and events 112 are a single aggregated data store.

Conventionally, the approach associated with failure prediction is based on a deterministic approach that processes deterministic rules. The approach, herein, is a hybrid statistical and machine learning technique that provides a probability of failure and a predicted time period for that potential or probable failure with real time continual refinement that improves on the accuracy of the probability calculations over time.

The system 100 provides a variety of benefits, such as detailed service ticket instructions to service engineers addressing the service ticket, predictive maintenance actions, predictive fault/failure actions, predictive dates or time frames for a predicted fault/failure. This results in reduce service engineer time spent on resolving service tickets, which reduces industry expenditures, and this results in higher uptime (availability) of the SSTs 120, which improves revenues in the industry.

In an embodiment, the SSTs 120 are ATMs.

In an embodiment, the SSTs 120 are kiosks.

In an embodiment, the SSTs 120 are self-checkout stations at retail stores.

In an embodiment, the SST 120 is an ATM that includes components identified as: one or more touch screen displays, a depository module, a currency dispenser module, a camera module, a media infeed module, a media deskew module, imager module, an encrypted Personal Identification Number (PIN) module, a magnetic stripe card reader, a scanner module, a keyboard module, a Near Field Communication (NFC) transceiver module, a Bluetooth® transceiver module, a Wi-Fi transceiver module, a speaker module, and a receipt printer. The components include a variety of parts, such as but not limited to, optical sensors, tracks, rotator motor, infrared (IR) sensors, motion sensors, metallic sensors, ultrasonic sensors, temperature sensors, belts, pulleys, and the like.

In an embodiment, the system 100 includes one or more analyst devices 140 that include an interface for requesting or receiving performance reports from the predictor 114. The analyst devices 140 may also be for receiving trend reports or notices produced by the predictor 114 when the predictor 114 predicts a likely failure for an SST 120, a component of the SST 120, and/or a part of the component based on a configured threshold value (probability value (0-1)) that can be configured by an analyst through the interface.

In an embodiment, the devices 130 and 140 can include one or more of: a desktop computer, a laptop computer, a phone, a wearable processing device, and an appliance with processor and network capabilities that is part of the Internet-Of-Things (IoTs).

In an embodiment, the server 110 is two or more servers that logically cooperate as part of a cloud processing environment.

The above-presented embodiments and other embodiments are now discussed with reference to the FIGS. 2-4.

Figure 2:
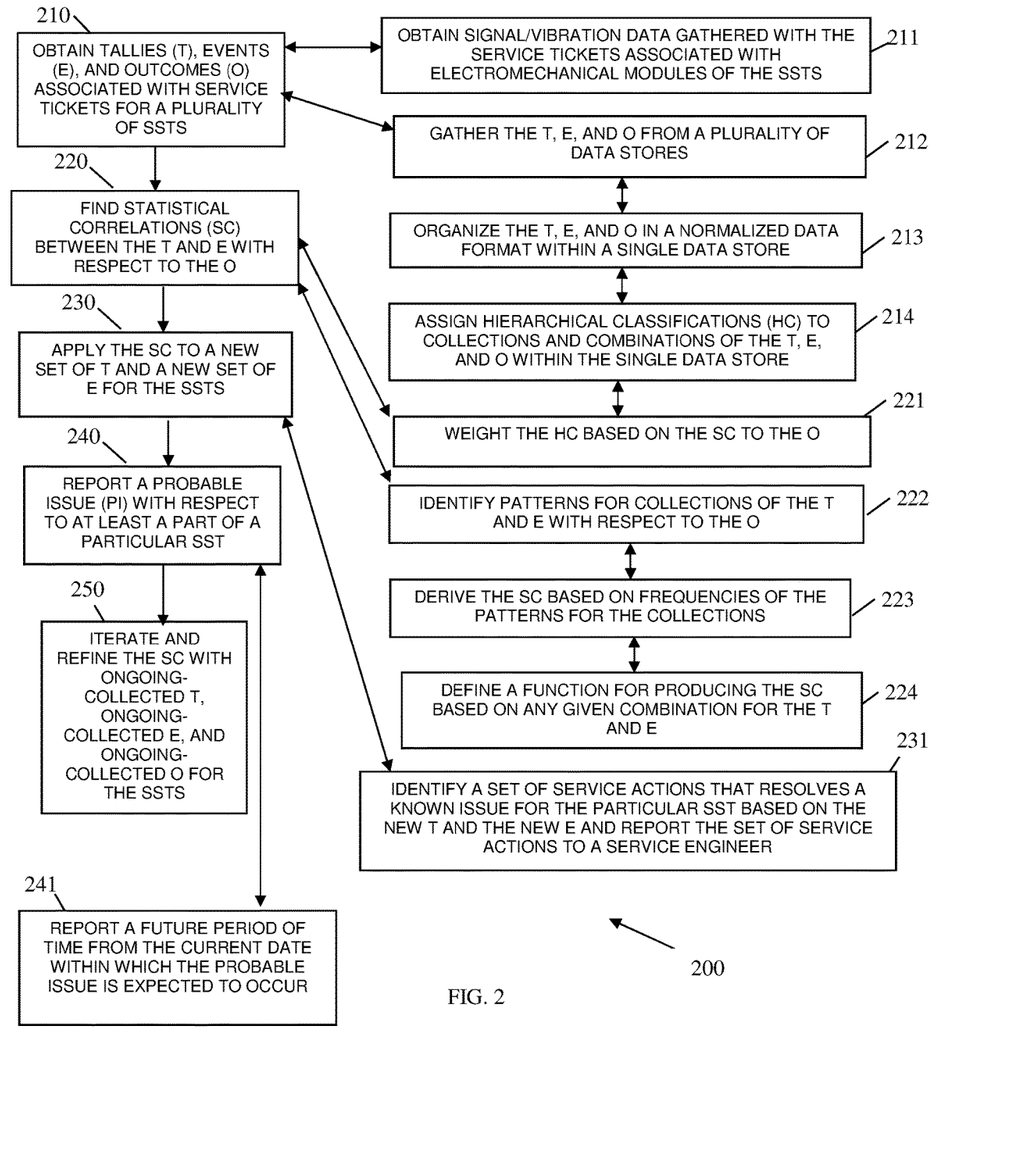
FIG. 2 is a diagram of a method for SST maintenance and support processing, according to an example embodiment.

FIG. 2 is a diagram of a method for SST maintenance and support processing, according to an example embodiment. The software module(s) that implements the method 200 is referred to as a "maintenance and support manager." The maintenance and support manager is implemented as executable instructions programmed and residing within memory and/or a non-transitory computer-readable (processor-readable) storage medium and executed by one or more processors of a device. The processor(s) of the device that executes the maintenance and support manager are specifically configured and programmed to process the maintenance and support manager. The maintenance and support manager has access to one or more networks during its processing. The networks can be wired, wireless, or a combination of wired and wireless.

In an embodiment, the maintenance and support manager is all or some combination of the modules 113-114.

In an embodiment, the device that executes the maintenance and support manager is the server 110.

In an embodiment, the device that executes the maintenance and support manager is a plurality of servers logically organized as a cloud processing environment.

At 210, the maintenance and support manager obtains tallies, events, and outcomes with service tickets for a plurality of SSTs. The tallies and events can be any of the tallies and events defined above or custom defined tallies and events for a specific type of SST or a specific transaction that a specific SST is configured to process.

Service tickets are provided when a service engineer services the SSTs (service calls) and identifies actions taken by the service engineer as portions of the outcomes. In addition to the actions defined in the outcomes, the outcomes may include or be associated with other service records for the SSTs, such as (and as discussed above and below), signal/vibration data for components or parts of components associated with the SSTs as gathered for the SSTs by the service engineer when resolving service tickets.

For example, at 211, the maintenance and support manager obtains signal/vibration data gathered by the service engineer when servicing the service tickets in service records. The signal/vibration data is associated with readings obtained by the service engineer for electromechanical modules of the SSTs. This was discussed above with respect to gathering the signal/vibration data at a part level of a component associated with an SST.

In an embodiment, at 212, the maintenance and support manager gathers the tallies, events, and outcomes from a plurality of data stores. In an embodiment, the data stores are disparate data stores from one another. In an embodiment, the tallies, events, and outcomes are gathered through a database join operation across the plurality of data stores.

In an embodiment of 212 and at 213, the maintenance and support manager organizes the tallies, events, and outcomes into a normalized data format for a configured or predefined data model within a single data store (note that this can also be done through a database join across a plurality of database tables).

In an embodiment of 213 and at 214, the maintenance and support manager assigns hierarchical classifications to collections and combinations of the tallies, events, and outcomes within the single data store. For example, a single part for a single component of a specific SST may be assigned (through data store fields) a plurality of different hierarchical classifications.

At 220, the maintenance and support manager finds statistical correlations between the tallies and events with respect to the known recorded outcomes from results of closing the service tickets. This can be done in a variety of manners (some of which were discussed above with the FIG. 1).

For example, and in an embodiment of 214 and 220, at 221, the maintenance and support manager weights the hierarchical classifications based on the statistical correlations to the outcomes. These weights may be probabilities (0-1) that a particular classification affected a given outcome.

In an embodiment, at 222, the maintenance and support manager may identify patterns for collections of the tallies and events with respect to the outcomes. For example, when tallies for an SST exceed a threshold in a given period of time and a given component error was generated for that SST, the pattern was associated with an outcome that was resolved by replacing a given part of the given component. It is noted that this is but one example, and the patterns can be more complex and entail multiple different combinations of tallies and events.

In an embodiment, at 223, the maintenance and support manager derives the statistical correlations based at least in part on the frequencies of the patterns for the collections. That is, patterns with higher frequencies to a given outcome are assigned a higher statistical correlation.

In an embodiment, the maintenance and support manager derives the statistical correlations through a SVM utilizing linear regression on the tallies, events, and outcomes.

At 230, the maintenance and support manager applies the statistical correlations to a new set of tallies and a new set of events for the SSTs. The processing 210-224 reflects training as discussed above with the FIG. 1. At 230, dynamically collected or obtained tallies and events for the SSTs are provided as input to the statistical correlations to predict what the outcome is likely to be for the new tallies and events and to identify those actions taken to achieve the outcome.

Accordingly, at 231, the maintenance and support manager identifies a set of service actions that resolves a known issue for a particular SST (the SST associated with the new set of tallies and the new set of events) based on applying the statistical correlations with the new tallies and new events for the particular SST. The maintenance and support manager also dynamically reports the set of service actions to a reporting system or directly to a service engineer associated with the particular SST.

At 240, the maintenance and support manager reports a probably issue with respect to at least a part of a particular SST. That is, the result from applying the new set of tallies and the new set of events against the statistical correlations is a probability (0-1) of a maintenance issue, and the maintenance issue identified in the service records as part of resolved outcomes for the service records. In an embodiment, the probable issue is not reported unless the maintenance and support manager determines that the probability calculated exceeds a predefine threshold (e.g., greater than 50% or 0.5). In an embodiment, the predefined threshold can be set manually through an interface to the maintenance and support manager.

In an embodiment, at 241, the maintenance and support manager reports a future period of time from a current date (date in which the probable issue was calculated by the maintenance and support manager) within which the probable issue is expected to occur. That is, the statistical correlations can also provide probabilities that indicate an elapsed period of time when the issue surfaced after noting the tallies and events. This provides a prediction not only of a probable issue but a time frame or period when the probable issue is likely to arise.

In an embodiment, at 250, the maintenance and support manager processes as a machine learning algorithm that is dynamically receiving ongoing-collected tallies, ongoing-collected events, and ongoing-collected outcomes through iteration (continuous processing). This refines the statistical correlations such that the statistical correlations are becoming more accurate and precise at predicting SST issues. This was also discussed above with the system 100 of the FIG. 1.

Figure 3:
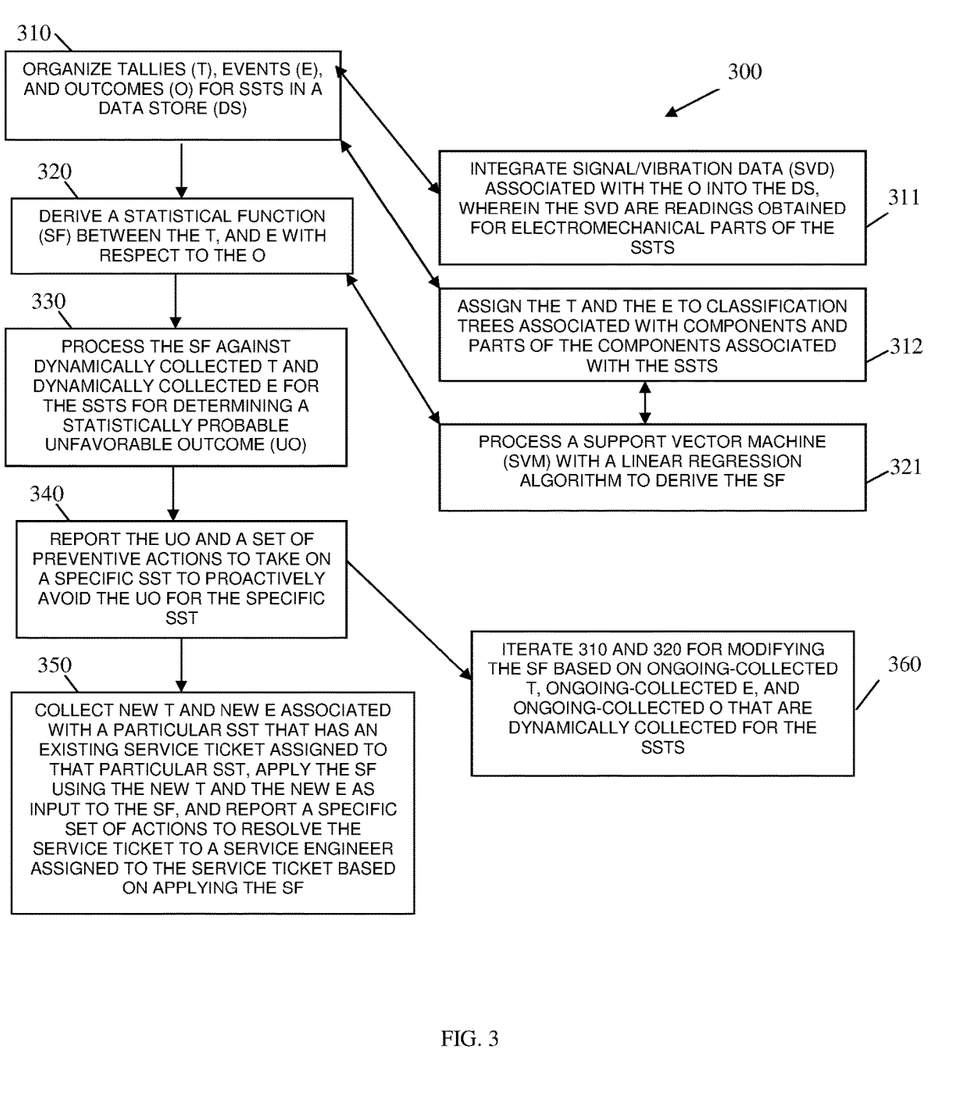
FIG. 3 is a diagram of another method for SST maintenance and support processing, according to an example embodiment.

FIG. 3 is a diagram of another method for maintenance and support processing, according to an example embodiment. The software module(s) that implement the method 300 is referred to herein as a "predictor." The predictor is implemented as executable instructions and programmed within memory and/or a non-transitory computer-readable (processor-readable) storage medium that executes on one or more processors of a device. The processors of the device are specifically configured to execute the predictor. The predictor has access one or more networks; the networks can be wired, wireless, or a combination of wired and wireless.

In an embodiment, the predictor is all or some combination of the modules 112, 113, and/or the method 200.

In an embodiment, the device that executes the predictor is the server 110.

In an embodiment, the device that executes the predictor is a plurality of servers organized as a cloud processing environment (cloud).

The predictor presents another and enhanced processing perspective from that which was described above with the method 200 of the FIG. 2.

At 310, the predictor organizes tallies, events, and outcomes for SSTs in a data store. That is, the tallies, events, and outcomes (service records for service calls (tickets) and results for the service calls) are modeled in a data store with fields and attributes for processing the predictor.

In an embodiment, at 311, the predictor integrates fine-grain signal/vibration data associated with the outcomes (through the service records) that were obtained as readings for electromechanical parts of components within the SSTs.

According to an embodiment, at 312, the predictor assigns the tallies and events to classification trees associated with components and parts of those components within the SSTs.

At 320, the predictor derives a statistical function between the tallies and events with respect to the outcomes. That is, the function takes as input tallies and events and produces as output a predicted outcome.

In an embodiment of 312 and 320, at 321, the predictor processes a SVM with a linear regression algorithm to derive the statistical function.

At 330, the predictor processes the statistical function against dynamically collected tallies and dynamically collected events for the SSTs and determines a statistically probable unfavorable outcome for a specific SST.

At 340, the predictor reports the statistically probable unfavorable outcome and a set of preventive actions to take on the specific SST to proactively avoid the unfavorable outcome for the specific SST. Again, the preventive actions are linked to the known outcome and its service records for previous resolved service calls.

In an embodiment, at 350, the predictor collects new tallies and new events associated with a particular SST that has an existing service ticket (service call) outstanding and assigned to that particular SST. The predictor applies the statistical function using the new tallies and new events from that particular SST as input to the function and reports a specific set of actions for resolving the service ticket (service call) to a service engineer that is assigned to that service ticket based on a predicted outcome produced as output from the function. Previous known outcomes that match the predicted outcome include the specific set of actions in their corresponding service records.

According to an embodiment, at 360, the predictor iterates the processing at 310 and 320 for dynamically and in real time modifying the statistical function based on ongoing-collected tallies, ongoing collected events, and ongoing-collected outcomes that are being dynamically collected for the SSTs.

Figure 4:
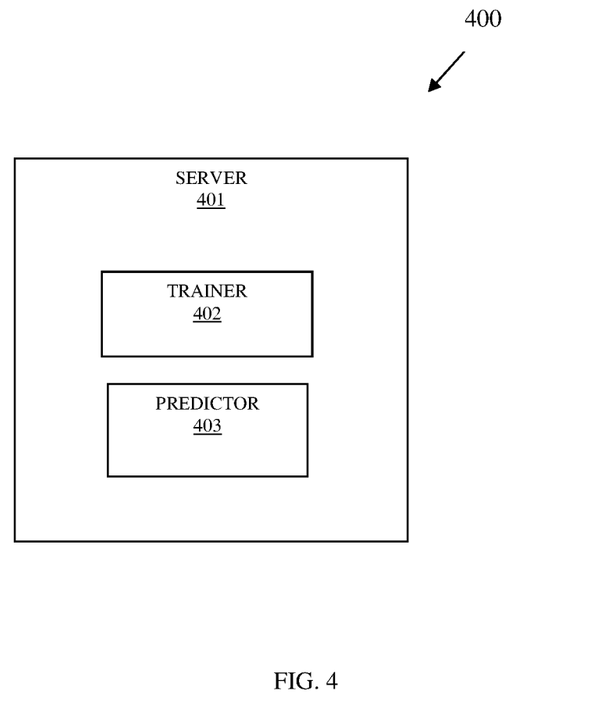
FIG. 4 is a diagram of another system for SST maintenance and support processing, according to an example embodiment.

FIG. 4 is a diagram of another system 400 for maintenance and support processing, according to an example embodiment. The components of the system 400 are programmed and reside within memory and/or a non-transitory computer-readable medium and execute on one or more processors of one or more the devices of the system 400. The system 400 also has access and can communicate over one or more networks; and the networks can be wired, wireless, or a combination of wired and wireless.

The system 400 is configured and programmed to perform the processing discussed above with the FIGS. 1-3.

The system 400 includes a server 401 a trainer 402 and a predictor 403.

In an embodiment, the server 401 is the server 110.

In an embodiment, the server 401 is a part of a cloud processing environment.

In an embodiment, the trainer 402 is all of or some combination of: the modules 112, 113, the method 200, and/or the method 300.

In an embodiment, the predictor 403 is all or some combination of: the modules 112, 113, the method 200, and/or the method 300

The trainer 402 executes on the server 401 and is configured to: i). statistically correlate tallies and events for SSTs to outcomes associated with resolved outcomes for resolved service tickets on the SSTs, and ii) derive the predictor 403 as a function that predicts a future outcome for any given one of the SSTs based on input associated with particular tallies and particular events for a particular SST.

The predictor 403 executes on the server 401 and is configured to: i) process the particular tallies and the particular events and assign a probability to the future outcome, ii) identify actions to take on the particular SST to avoid the future outcome, and iii) report an identifier for the particular SST, the probability, the future outcome, and the actions.

In an embodiment, the predictor 403 is further configured to: predict a time frame from a current date during which the future outcome will occur and report the time frame.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
obtaining, by executable instructions that execute on a hardware processor of a server from a non-transitory computer-readable storage medium, tallies, events, and outcomes associated with service tickets and service reports for a plurality of Self-Service Terminals (SSTs), wherein obtaining further includes obtaining signal data from the SSTs and extracting signal features comprising spectral slope and audio spectrum flatness, wherein obtaining further includes obtaining electromechanical vibrational data associated with rotational and mechanical components of the SSTs and extracting vibration features for the electromechanical vibrational data, wherein obtaining further includes identifying from the service tickets and service reports the signal data and electromechanical vibration data from motors, tracks, sensors, pumps, compressors, microphones, valves, cameras, turbines, and HVAC machines of the SSTs;
finding, by executable instructions, statistical correlations between the tallies, events, signal features, and vibration features with respect to the outcomes;
applying, by executable instructions, the statistical correlations to a new set of tallies, a new set of signal data and electromechanical vibration data having new signal features, new vibration features, and a new set of events for the SSTs by processing a hybrid statistical analysis that is combined with processing a machine learning algorithm and obtaining a probable issue with respect to at least a part of a particular SST, wherein applying further includes continuously training the machine learning algorithm using hierarchical classification trees that classifies parts of a given mechanical component with the given mechanical component, classifies groupings of the mechanical components by component functions, and classifies groupings of the mechanical components with related mechanical components;
reporting, by executable instructions, a probable issue; and
processing hybrid statistical analysis and the machine learning algorithm to provide probable failures in the SSTs and predicted time periods that the probable failures are to occur with continuous refinement based on observed actions taken with respect to the SSTs and the observed actions provided back to the hybrid statistical analysis and the machine learning algorithm for the refinement.

2. The method of claim 1, wherein obtaining further includes gathering the tallies, events, and outcomes from a plurality of data stores.

3. The method of claim 2, wherein gathering further includes organizing the tallies, events, and outcomes in a normalized data format within a single data store.

4. The method of claim 3, wherein organizing further includes assigning hierarchical classifications to collections and combinations of the tallies, events, and outcomes using the hierarchical classification trees within the single data store.

5. The method of claim 4, wherein finding further includes weighting the hierarchical classifications based on the statistical correlations to the outcomes.

6. The method of claim 1, wherein finding further includes identifying patterns for collections of the tallies and events with respect to the outcomes.

7. The method of claim 6, wherein identifying further includes deriving the statistical correlations based on frequencies of the patterns for the collections.

8. The method of claim 7, wherein deriving further includes producing the statistical correlations based on any given combination for the tallies and events and producing the statistical correlations.

9. The method of claim 1, wherein applying further includes identifying a set of service actions that resolves a known issue for the particular SST based on the new tallies and the new events and reporting the set of service actions to a service engineer.

10. The method of claim 1, wherein reporting further includes reporting a future period of time from the current date within which the probable issue is expected to occur.

11. The method of claim 1 further comprising, iterating the method and refining the statistical correlations with ongoing-collected tallies, ongoing-collected events, and ongoing-collected outcomes for the SSTs.

12. A method, comprising:
organizing, by executable instructions that execute on a hardware processor of a server from a non-transitory computer-readable storage medium, tallies, events, signal data, electromechanical vibration data, and outcomes for Self-Service Terminals (SSTs) in a data store, wherein the data store comprising service tickets and service reports for the SSTs, wherein organizing further includes extracting signal features from the signal data a comprising spectral slope and audio spectrum flatness, wherein organizing further includes extracting vibration features from electromechanical rotational data associated with rotational and mechanical components of the SSTs, wherein organizing further includes identifying from the service tickets, the service reports, the signal data, and electromechanical vibration data for motors, tracks, sensors, pumps, compressors, microphones, valves, cameras, turbines, and HVAC machines of the SSTs;

deriving, by executable instructions, a statistical function between the tallies, the signal features, the vibration features, and events with respect to the outcomes by processing a hybrid statistical analysis that is combined with processing a machine learning algorithm and obtaining the statistical function;

processing, by executable instructions, the statistical function against dynamically collected tallies, dynamically collected signal data and dynamically collected electromechanical vibration data with dynamically extracted signal features, and dynamically extracted vibration features, and dynamically collected events for the SSTs for determining a statistically probable unfavorable outcome;

reporting, by executable instructions, the statistically unfavorable probable outcome and a set of preventive actions to take on a specific SST to proactively avoid the statistically probable unfavorable outcome for the specific SST;

continuously training the machine learning algorithm using hierarchical classification trees that classifies parts of a given mechanical component with the given mechanical component, classifies groupings of the mechanical components by component functions, and classifies groupings of the mechanical components with related mechanical components; and processing hybrid statistical analysis and the machine learning algorithm to provide probable failures in the SSTs and predicted time periods that the probable failures are to occur with continuous refinement based on observed actions taken with respect to the SSTs and the observed actions provided back to the hybrid statistical analysis and the machine learning algorithm for the refinement.

13. The method of claim 12, wherein organizing further includes assigning the tallies and the events to classifications using the hierarchical classification trees that are associated with the mechanical components and the parts of the mechanical components associated with the SSTs.

14. The method of claim 13, wherein deriving further includes processing a Support Vector Machine (SVM) with a linear regression algorithm to derive the statistical function for the statistical analysis.

15. The method of claim 12 further comprising, iterating the organizing and deriving for modifying the statistical function based on ongoing-collected tallies, ongoing-collected events, and ongoing-collected outcomes that are dynamically collected for the SSTs.

16. The method of claim 12 further comprising, collecting new tallies and new events associated with a particular SST that has an existing service ticket assigned to that particular SST, applying the statistical function using the new tallies and the new events as input to the statistical function, and reporting a specific set of actions to resolve the service ticket to a service engineer assigned to the service ticket based on applying the statistical function.

17. A system, comprising:
a server comprising a hardware processor and a non-transitory computer-readable storage medium comprising executable instructions representing a trainer and a predictor;
the trainer when executed by the hardware processor causes the hardware processor to perform processing comprising:
  identifying from service reports and service tickets signal data and electromechanical vibration data for motors, tracks, sensors, pumps, compressors, microphones, valves, cameras, turbines, and HVAC machines of Self-Service Terminals (SSTs);
  statistically correlating tallies, the signal data, the electromechanical vibration data, and events for SSTs to outcomes associated with outcomes for resolved service tickets on the SSTs; and
  extracting signal features from the signal data data comprising spectral slope and audio spectrum flatness;
  extracting vibration features from electromechanical vibration data associated with rotational and mechanical components of the SST;
  deriving the predictor as a function that predicts a future outcome for any given one of the SSTs based on input associated with particular tallies, particular signal data and particular electromechanical vibration data having particular extracted signal features, particular vibration features, and particular events for a particular SST by processing a hybrid statistical analysis that is combined with processing a machine learning algorithm and obtaining the function;
  continuously training the machine learning algorithm using hierarchical classification trees that classifies parts of a given mechanical component with the given mechanical component, classifies groupings of the mechanical components by component functions, classifies groupings of the mechanical components with related mechanical components; and
  processing hybrid statistical analysis and the machine learning algorithm to provide probable failures in the SSTs and predicted time periods that the probable failures are to occur with continuous refinement based on observed actions taken with respect to the SSTs and the observed actions provided back to the hybrid statistical analysis and the machine learning algorithm for the refinement; and
the predictor when executed by the hardware processor causes the hardware processor to perform processing comprising:
  processing the particular tallies, the particular extracted signal features, the particular vibration features, and the particular events and assign a probability to the future outcome;
  identifying actions to take on the particular SST to avoid the future outcome; and
  reporting an identifier for the particular SST, the probability, the future outcome, and the actions.

18. The system of claim 17, wherein the predictor when executed by the hardware processor is further configured to cause the hardware processor to perform additional processing comprising:
predicting a time frame from a current date during which the future outcome will occur and report the time frame.

* * * * *